United States Patent Office 3,364,983
Patented Jan. 23, 1968

3,364,983
HEAT EXCHANGE PROCESS AND APPARATUS
Stanley M. Krinov, North Madison, Ohio, and Maurice G. Figuet and Andre L. Michaud, Vieux-Thann, and Robert J. Mas, Thann, France, assignors to Cabot Corporation, Boston, Mass., a corporation of Delaware
Continuation-in-part of application Ser. No. 382,247, July 13, 1964. This application Jan. 4, 1965, Ser. No. 423,126
18 Claims. (Cl. 165—1)

This application is a continuation-in-part of U.S. application Ser. No. 382,247, filed July 13, 1964.

The present invention relates to heat exchange apparatus and more specifically to an improved method and apparatus for cooling gaseous mixtures containing entrained particulate metal oxides.

In recent years, pyrogenic processes in which particulate metal or metalloid oxides such as titanium dioxide, silicon dioxide, zirconium dioxide and the like, are produced in a gaseous environment at elevate temperatures have assumed a position of industrial importance. Generally speaking, it is important in such processes in the interests of product quality, uniformity and equipment preservation, that the product stream be cooled quickly after leaving the reaction zone. Consequently, the product stream comprising the particulate pyrogenic oxide product is generally conveyed through heat exchange apparatus relatively soon after leaving the reaction zone.

One of the more serious problems which has heretofore confronted the pyrogenic metal oxide producing industry resides in the fact that the particulate metal oxide in the product stream tends to deposit on heat exchanger surfaces. Over a period of time said deposition results in vastly reduced efficiency of heat transfer and/or an excessive pressure drop through the heat exchanger. Moreover, since the product stream often contains substances which are more highly corrosive at higher temperatures, loss of cooling efficiency can lead to increased wear of the equipment. These problems have been found to be particularly acute in processes wherein the metal oxide product is titanium dioxide or silicon dioxide. Said oxides, while hot, generally form deposits which are extremely tenacious and which have little or no tendency to purge themselves. Thus, it is generally found that in pyrogenic processes wherein titanium or silicon oxides are formed, periodic shutdown of the process is generally required in order to remove deposits from heat exchanger tubes and thereby restore normal thermal efficiency thereto. Obviously, then, deposition of metal oxides on heat exchanger tubes constitutes a serious economic loss and a potential danger to equipment. In accordance with the present invention, however, the problems arising from deposition of particulate metal oxide on the walls of heat exchanger tubes have been virtually eliminated.

It is a principal object of the present invention to provide improved heat exchange apparatus.

It is another object of the present invention to provide novel and useful improvements in a process for effecting heat exchange from gaseous streams containing entrained particulate metal oxides.

Other objects and advantages of the present invention will in part be obvious and will in part appear hereinafter.

In accordance with the present invention it has been discovered that deposition on walls of heat exchanger tubes of solid particulate metal oxides entrained in a gaseous medium can be minimized by periodically propagating in said medium a pressure front countercurrent to the flow of said medium.

The present invention is generally applicable to heat exchange apparatus of the type wherein heat transfer is effected between fluids (liquid or gas) separated by a heat conducting wall. Said type of apparatus is known in the art generally as "shell and tube" heat exchange apparatus. Said "shell and tube" apparatus can be of any convenient configuration such as liner or U-shaped.

A better understanding of the present invention can be had when reference is made to the drawings forming part hereof wherein.

Figure 2:
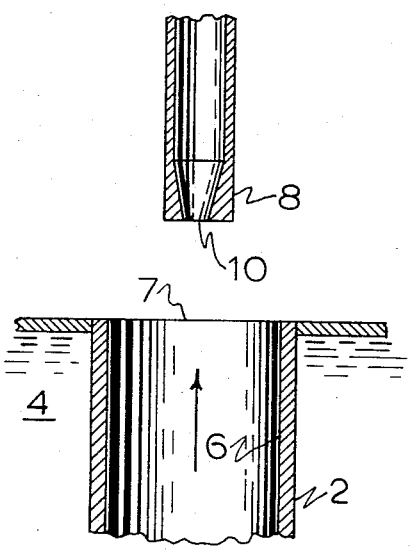
FIGURE 2 is an enlarged schematic diagrammatic sectional side view of a single heat exchange tube and the preferred associated means for propagating a pressure front therein.

Referring now to FIGURE 2 which represents a preferred embodiment of the present invention, a hot gaseous stream in which solid particulate metal oxide is entrained is conveyed through tube 2 in the direction indicated by the arrow. Heat exchange is effected between said stream and fluid 4 through said tube. In practice, deposition of particulate metal oxide frequently occurs upon wall 6. In accordance with this embodiment of the present invention, high pressure pulse gas is periodically discharged from discharge tube 8 through orifice 10 at outlet 7 of tube 2, thereby causing a pressure front to be propagated in the stream flowing through tube 2 countercurrent to the direction of flow. In this manner, wall 6 of tube 2 are maintained free of deposited metal oxide.

Gases suitable for use as the pulse gas are subject to considerable variation. Generally speaking, any gas which is inert with respect to the substances comprising the stream flowing through tube 2 and which does not deleteriously affect the equipment is suitable. Specific examples of gases which are generally suitable for use as pulse gases in the production of pyrogenic titanium dioxide, for example, are: nitrogen, chlorine, argon, xenon, carbon dioxide, air and mixtures thereof. Obviously, process gases can also be recycled from downstream processing steps for use as the pulse gas.

The optimum pressure at which the pulse gas should be discharged is generally dependent upon several parameters such as (a) the nature of the deposition on walls 6, (b) the flow rate of the product stream through tubes 2, (c) the size of tubes 2, etc. The pressure required under any given circumstances can be determined in practice when such parameters are fully taken into consideration. It has been discovered, however, that in order to obtain good results, it is generally necessary that the static pressure of the pulse gas be at least one order of magnitude higher than the pressure existing within tubes 2. I find, for instance, that in order to minimize titanium dioxide deposition on walls of heat exchanger tubes of about 2" in diameter wherein the pressure is about atmospheric that the pulse gases should be discharged at a pressure of at least about 75 p.s.i. Preferably, higher pressures, i.e. above about 100 p.s.i., should be utilized.

The duration of the pulse gas discharge is also subject to considerable variation. Generally speaking, pulse gas discharges having durations of between about 0.1, and preferably 0.2, and about 1 second are satisfactory. Obviously, durations of greater than 1 second can be utilized. However, I have found that further increases in benefits derivable from pulse gas discharges of greater than about 1 second in duration are generally small. Moreover, it should be borne in mind that dilution of product streams, which is normally undersirable, generally increases when the duration of discharge is increased.

Generally speaking, the greater the frequency of discharges (all other conditions remaining equal, of course) the less deposition of metal oxide occurs. I have found, for instance, that generally a discharge frequency of at least 1 pulse per 15 minutes per tube is more effective than a discharge frequency of 1 pulse per 45 minutes per tube. However, it should again be noted that said frequency should be determined for any given situation bearing in mind (a) the extent of improvement or maintenance of heat exchange efficiency desired, and (b) the increase in dilution of the production stream usually effected as said frequency is increased.

Figure 1:
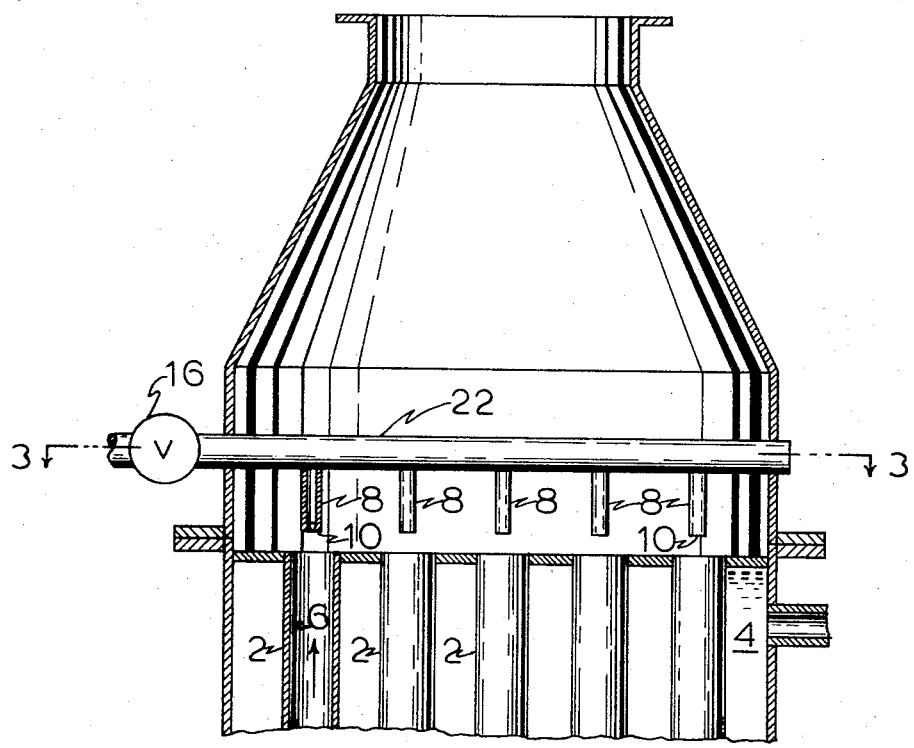
FIGURE 1 is a schematic diagrammatic side view, partially in section, of a preferred multitube "shell and tube" type heat exchange apparatus of the present invention.
Figure 3:
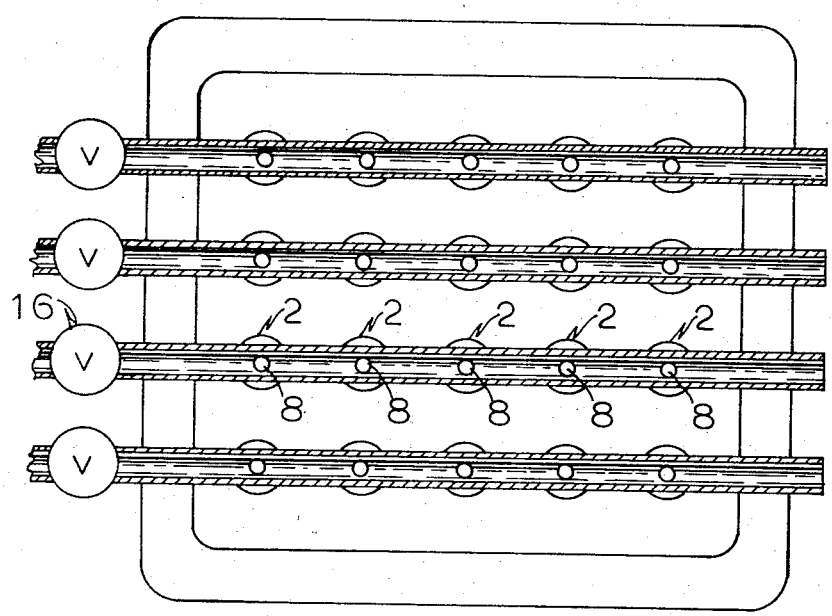
FIGURE 3 is a schematic diagrammatic cross-sectional view of FIGURE 1 taken along line 3—3.

In a typical situation, referring now to FIGURES 1 and 3, hot gases containing entrained particulate metal oxides course through exchanger tubes 2 in the direction shown by the arrows. For the sake of clarity, the following discussion relates only to one row of tubes in FIGURE 3 and only to the type of apparatus illustrated in FIGURES 1-3. However, it should be understood that the steps involved in maintaining the walls of said row of tubes substantially free from metal oxide deposition apply to the remaining tubes. Moreover, the principles illustrated by the following discussion are entirely applicable to moving pressure fronts which are produced by any type of apparatus.

Valve 16 which is connected to a high pressure gas source (not shown) is opened momentarily allowing high pressure gas to flow seriatim through valve 16, conduit 22, discharge tubes 8 and orifice 10. Note that the gas discharge through orifice 10 is discharged countercurrent to the flow through tubes 2. Surprisingly, there results an effective removal of metal oxide deposited on walls 6 of tubes 2. After a predetermined interval, valve 16 is closed thereby arresting the flow of gas therethrough.

The momentary opening of the valves and the timing of the pulses can be accomplished in any suitable manner. For instance, solenoid valves generally display rapid opening and closing rates which can provide substantially instantaneous flow of gas therethrough. In addition, timer means can be utilized which, during operations, control (1) the number of conduits through which pulse gases are flowed (thus, ultimately controlling the number of simultaneous discharges), (2) the duration of the pulse, and (3) the frequency of the pulse.

While pulse gas discharge can be effected from all of discharge tubes 8 simultaneously, it is generally preferable that no more than about 25% of the total number of tubes 8 discharge simultaneously. Discharging more than about 25% of the total number at any one time has been found to severely disrupt flow patterns upstream of the heat exchanger.

It is believed, that periodic discharges of pulse gas at heat exchange apparatus tubes countercurrent the flow of process gases propagate pressure fronts through said tubes which remove solid deposits from the walls thereof, or, in any event loosen said deposits to the extent that the flow of the product stream then removes them. It is further believed that many pyrogenic metal oxides such as pyrogenic titanium dioxide tend to deposit layers oriented in the direction of flow of the product stream and that by propagating a pressure front countercurrent the flow of the product stream said layers are disrupted. I have found that when pressure fronts are propagated through heat exchange tubes in the *same* direction as the flow of the product stream, the remarkable benefits of the present invention are either not attainable at all or are attainable only to a substantially lesser degree.

Thus, far, the only specific means mentioned for propagating a pressure front has related to the apparatus illustrated in FIGURES 1-3. Obviously, however, the present invention is not limited to the use of that type of apparatus or to the use of high pressure pulses of gas for propagating the required pressure front. Any means, chemical or mechanical, which will periodically propagate a pressure front in a medium countercurrent to the direction of flow of said medium is suitable for the purposes of the present invention. Thus, for example, apparatus similar to the type illustrated in FIGURES 1-3 can be utilized to discharge a mixture of oxygen and hydrogen directly into the downstream end of tubes 2, which mixture when detonated for example by a spark will produce a pressure front which in part will be propagated through the medium in tubes 2 countercurrent to the direction of flow.

Also a mechanical plunger means rapidly propelled toward but coming to a stop at or near end 7 of tubes 2 will cause a pressure front to be propagated through the medium in tubes 2 countercurrent to the direction of flow of said medium. Accordingly, the present invention is not limited to the use of any particular apparatus or process for propagating the pressure front.

The benefits of the present invention are demonstrated in the following examples which are illustrative in nature and should not be construed as limiting the scope of the invention:

Example 1

Through the tubes of a continuously water-cooled shell and tube heat exchange apparatus of the type illustrated in FIGURES 1 and 3, each tube being 30 feet in length and having a 2" I.D. there was conducted a product stream comprising about 4% by weight entrained particulate titanium dioxide at a total mass rate of about 3,500 lbs./hr. The temperatures of the product streams entering and leaving tubes 2 as well as the pressure drop thereacross were continuously monitored. The following table indicates operational conditions during a 12-hour run at the end of which shutdown was necessitated due to excessive pressure drop and the increased temperature of the exiting stream.

| Elapsed operational time (hours) | Temp. of stream entering tubes 2 | Temp. of stream exiting tubes 2 | Pressure drop across tubes 2 ($H_2O$) |
| --- | --- | --- | --- |
| 0 | 500° C. | 270° C. | 10" |
| 6 | 500° C. | 330° C. | 17" |
| 12 | 500° C. | 425° C. | 40" |

After shutdown tubes 2 were examined and it was found that titanium dioxide was deposited on the walls of said tubes to the extent that substantial plugging of tubes 2 had occurred.

Example 2

This example is a duplicate of Example 1 with the exception that pulses of air were discharged from orifice 10 at a pressure of about 115 p.s.i.g., a discharge duration of about 0.3 second and at an average frequency of about one discharge per 15 minutes per tube. No more than 10% of tubes 8 were discharged simultaneously. At startup of operations the temperature of the stream entering tubes 2 was about 500° C. while the temperature of the stream exiting tubes 2 was about 270° C. The pressure drop across the apparatus was determined to be about 10" $H_2O$. During 30 days of continuous operation said temperatures and the pressure drop remained substantially constant. Upon shutdown, examination, of the tubes revealed only a minor "dusting" of titanium dioxide on the walls of tubes 2.

The design criteria of the apparatus illustrated in FIGURES 1-3, such as the relative diameters of tubes 8 and tubes 2, "the stand-off" distance of tubes 8 from the downstream end of tubes 2, etc., can generally be readily determined in practice.

Obviously, many changes can be made in the above examples and description and in the accompanying drawings without departing from the scope of the invention.

For instance, in the specific process illustrated in the above examples, pulse gases other than air such as nitrogen, carbon dioxide, helium or recycled process gases are also suitable.

Also, it is obvious that, although no mention was made of auxiliary cooling of tubes 8 and other equipment associated therewith, such cooling can be accomplished, for example, by enclosing tubes 8 and said equipment in cooling jackets, etc.

Finally, it is obvious that the concepts and principles of the present invention are applicable to any situation in which a gas-entrained particulate metal oxide (the term "metal oxide" for the purposes of the present invention includes within its scope "metalloid oxides") is conveyed through pipe, conduit, ductwork, or the like.

Accordingly, it is intended that the disclosure be regarded as illustrative and as in no way limiting the scope of the invention.

What is claimed is:

1. In the process wherein heat exchange between a mixture comprising a gas and an entrained particulate solid and a fluid media is effected by providing a plurality of heat conducting conduits each having an inlet and an outlet, maintaining at least substantial portions of the exterior surfaces of said conduits in contact with said fluid media, and flowing said mixture through the interior of said conduits, the improvement which comprises periodically propagating a pressure front through said mixture in each of said conduits countercurrent to and during the flow of said mixture.

2. The process of claim 1 wherein the pressure front is propagated in less than about 25% of the total number of said conduits at one time.

3. In the process wherein heat exchange between a mixture comprising a gas and an entrained particulate solid and a fluid media is effected by providing a plurality of heat conducting conduits each having an inlet and an outlet, maintaining at least substantial portions of the exterior surfaces of said conduits in contact with said fluid media, and flowing said mixture through the interior of said conduits, the improvement which comprises periodically discharging an inert gas under high pressure at the outlet of each of said conduits countercurrent to and during the flow of said mixture.

4. The process of claim 3 wherein the duration of the discharge of inert gas is between about 0.1 and about 1 second.

5. The process of claim 3 wherein the duration of the discharge of inert gas is between about 0.2 and about 1 second.

6. The process of claim 3 wherein the inert gas is discharged at less than about 25% of the total number of said conduits at one time.

7. The process of claim 3 wherein the inert gas at the instant of discharge has a pressure at least one order of magnitude greater than the average pressure existing within said conduits.

8. The process of claim 3 wherein said particulate solid is titanium dioxide and the inert gas at the instant of discharge has a pressure greater than about 75 lbs./in.$^2$.

9. The process of claim 3 wherein said particulate solid is titanium dioxide and the inert gas at the instant of discharge has a pressure greater than about 100 lbs./in.$^2$.

10. The process of claim 3 wherein the inert gas is air.

11. The process of claim 3 wherein the inert gas comprises the gas utilized in said mixture.

12. In a heat exchanger comprising a plurality of heat conductive conduits each having an inlet for the introduction thereinto of a mixture comprising a gas and an entrained particulate solid, an outlet for said mixture, and in which there is provision for contacting a cooling fluid with the exterior of said conduits, the improvement which comprises a device for periodically discharging a gas under high pressure at the outlets of said conduits while said mixture is flowing through said conduits.

13. The process of claim 1 wherein said entrained particulate solid is a metal oxide.

14. The process of claim 3 wherein said entrained particulate solid is a metal oxide.

15. In a heat exchanger comprising a plurality of heat conductive conduits each having an inlet for the introduction thereinto of a mixture comprising a gas and an entrained particulate solid, an outlet for said mixture, and in which there is provision for contacting a cooling fluid with the exterior of said conduits, the improvement which comprises means for periodically propagating a pressure front into each of said conduits at the outlet end thereof while said mixture is flowing through said conduits.

16. In a heat exchanger having a plurality of heat conductive conduits each having an inlet for the introduction thereinto of a mixture comprising a gas and an entrained particulate solid and an outlet for said mixture, and in which there is provision for contacting a fluid with the exterior of said conduits, the improvement comprising means to discharge a gas under high pressure at each of said outlets while said mixture is flowing through said conduits, said discharge means comprising nozzle means directed at each of said outlets, means to convey gas under high pressure to said nozzle means, valve means functionally associated with said conveyance means, and timer means functionally related to each of said valve means.

17. In a heat exchanger comprising a plurality of heat conductive conduits each having an inlet for the introduction thereinto of a mixture comprising a gas and an entrained particulate solid and an outlet for said mixture, and in which there is provision for contacting a fluid with the exterior of said conduits, the improvement which comprises means to discharge a gas under high pressure at each of said outlets while said mixture is flowing through said conduits, said discharge means comprising nozzle means directed at each of said outlets, means to convey gas under high pressure to said nozzle means, and means to cause discharge of gas through no more than 25% of said nozzle means at one time.

18. The apparatus of claim 16 wherein said valve means are solenoid operated.

References Cited

UNITED STATES PATENTS

| 1,786,182 | 12/1930 | Whiton et al. | 165—95 |
| 2,351,163 | 6/1944 | Thomas | 165—84 |
| 2,766,968 | 10/1956 | Blizard | 165—95 |
| 3,045,978 | 7/1962 | Waldhofer | 165—95 |

FOREIGN PATENTS

| 846,950 | 9/1960 | Great Britain. |

ROBERT A. O'LEARY, *Primary Examiner.*

CHARLES SUKALO, *Assistant Examiner.*